Aug. 3, 1954
H. L. OLSON ET AL
2,685,633
HEATER FOR ELECTRIC TOASTERS
Filed Nov. 27, 1950
2 Sheets-Sheet 1
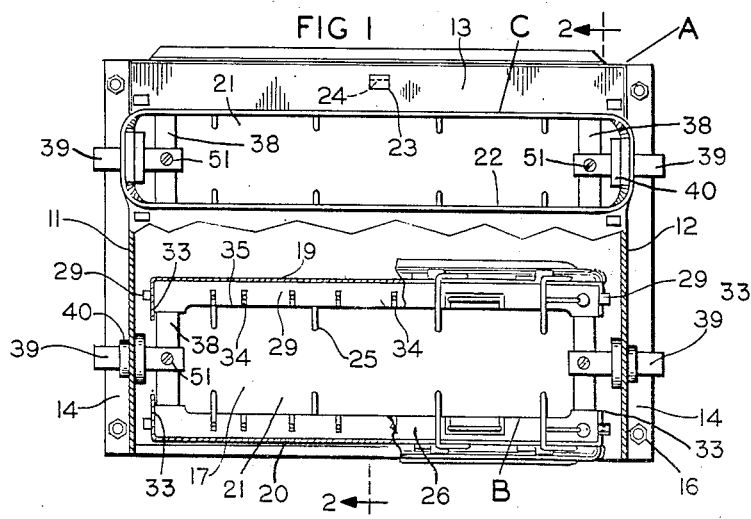
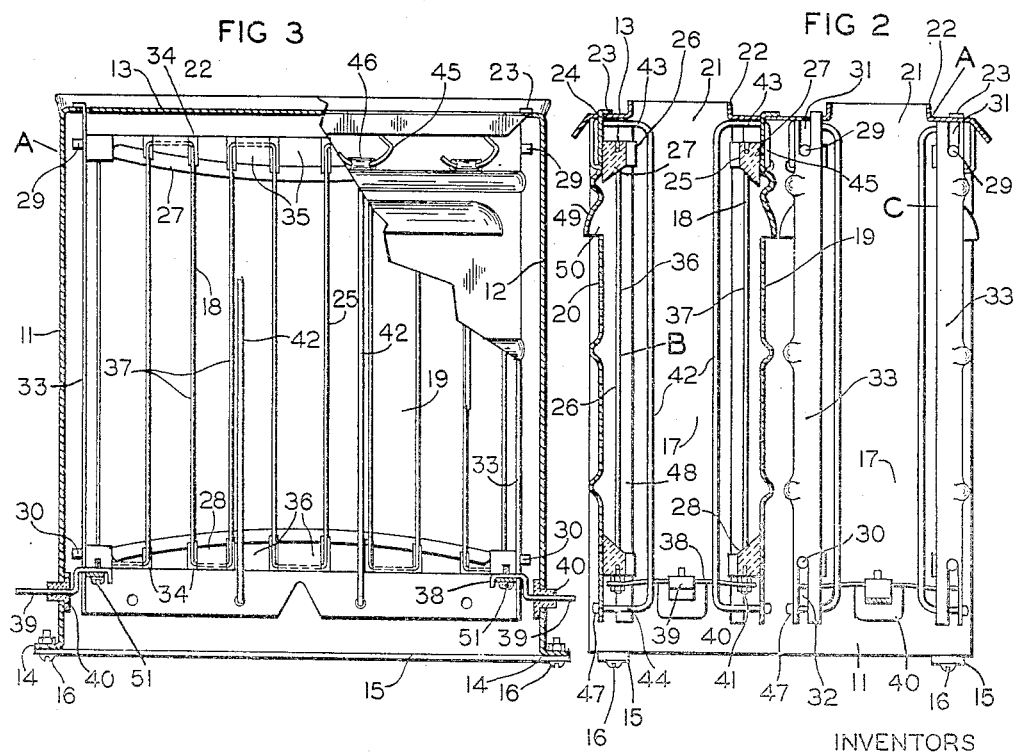
INVENTORS
HENRY L. OLSON
ROBERT A. MILLER
WILLIAM F. HALE
BY
*Caswell Legaard*
ATTORNEYS Aug. 3, 1954
H. L. OLSON ET AL
2,685,633
HEATER FOR ELECTRIC TOASTERS
Filed Nov. 27, 1950
2 Sheets-Sheet 2
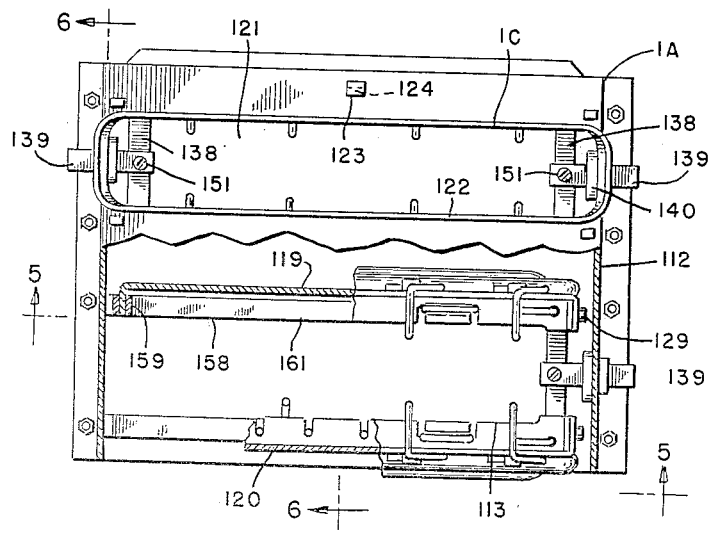
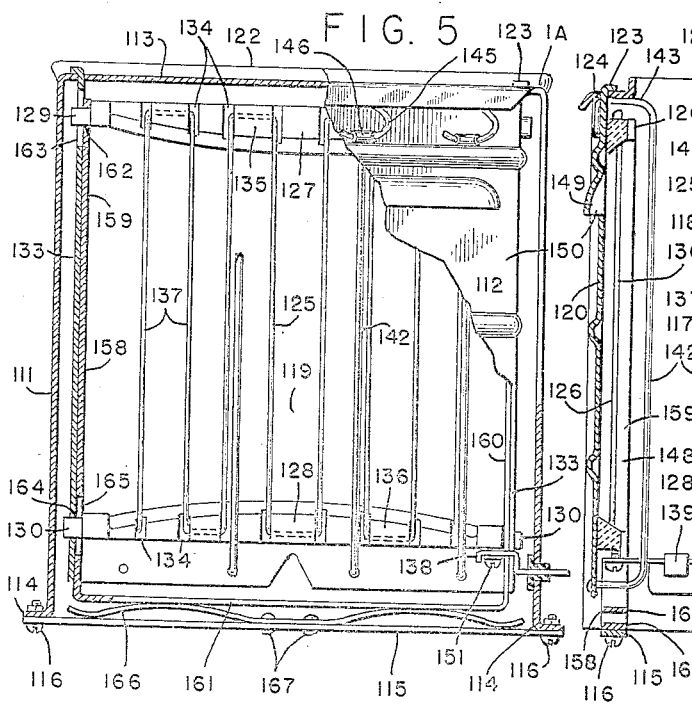
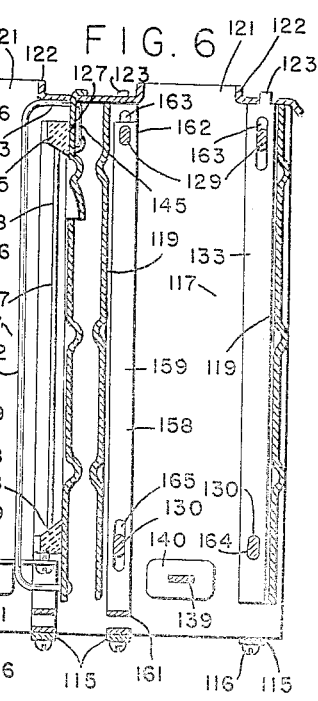
INVENTORS
HENRY L. OLSON
ROBERT A. MILLER
WILLIAM F. HALE
ATTORNEYS Patented Aug. 3, 1954

2,685,633

UNITED STATES PATENT OFFICE 2,685,633

HEATER FOR ELECTRIC TOASTERS

Henry L. Olson and Robert A. Miller, Grand Haven, and William F. Hale, Spring Lake, Mich., assignors to Camfield Manufacturing Company, Grand Haven, Mich., a corporation of Michigan Application November 27, 1950, Serial No. 197,759

8 Claims. (Cl. 219—19)

The herein disclosed invention relates to heaters for electric toasters and has for an object to provide a heater which can be built at a nominal cost and which will give adequate service at an economical consumption of electric energy.

Another object of the invention resides in providing a heater in which the supports for the heating elements consist of lugs of ceramic material instead of the sheets of mica heretofore customarily used.

A still further object of the invention resides in providing a heater in which elongation of the reaches of the heating element due to expansion, is compensated for to prevent movement of the reaches toward or from the toast during the operation of the toaster.

Another object of the invention resides in providing the heater with two heating units spaced from one another to provide a toasting chamber therebewteen in which the bread to be toasted may be placed.

An object of the invention resides in constructing each heating unit with a support in the form of a plate and having attached to the upper end of the same a series of lugs constructed of insulating material, and in further providing similar lugs at the lowermost portion of the plate and in alternately winding the heating elements about said lugs to form vertically extending reaches.

A still further object of the invention resides in providing a carrier for one series of lugs movable toward and from the lugs of the other series.

Another object of the invention resides in providing spring means for urging the carrier away from the upper lugs to tension the reaches of the heating element as the same expand.

A feature of the invention resides in utilizing said plate as a reflector for the heating element and in supporting the said reflector solely at the top to permit of the same expanding downwardly as the reflector becomes heated.

An object of the invention resides in utilizing a single spring at each end of the toasting chamber for simultaneously tensioning both of the carriers of the heating units.

A still further object of the invention resides in providing a louver at the upper end of each plate through which cool air may be admitted into the toasting chamber to prevent discoloration of the toast.

An object of the invention resides in providing an alternate construction in which the series of element supporting lugs at the bottom of the plate are fixed and those at the top of the plate are movable.

Other objects of the invention reside in the novel combination and arrangement of parts and in the details of construction hereinafter illustrated and/or described.

In the drawings:

Fig. 1 is a plan view of the frame of a toaster illustrating an embodiment of the invention applied thereto, portions of the frame and other parts being cut away to illustrate the invention proper.

Fig. 2 is an elevational sectional view taken on line 2—2 of Fig. 1.

Fig. 3 is a side elevational view of the structure shown in Fig. 1 with portions of the same broken away to more clearly illustrate the invention.

Fig. 4 is a view similar to Fig. 1 illustrating a modification of the invention.

Fig. 5 is a side elevational sectional view taken on line 5—5 of Fig. 4.

Fig. 6 is an elevational cross sectional view taken on line 6—6 of Fig. 4.

The structure shown in Figs. 1, 2 and 3 consists of a frame U-shaped in form having upper and end frame members all connected together. Between the end frame members are disposed two heaters for the purpose of simultaneously toasting two slices of bread. Each of these heaters consists of two heating units each comprising a vertically extending plate which plates extend between the end frame members and are spaced from one another to form with said frame members the toasting chamber. The said plates form supports for the heating elements, there being one heating element associated with each plate, said heating elements of each heater facing one another. The heating element disposed adjacent each of the plates consists of a length of resistance wire which is suported on two series of insulating lugs, one series being located at the upper end of the plate and the other series being located at the lower end of the plate. The upper lugs are attached to a bar of insulating material being integral therewith which is fixedly attached to the plate at the upper portion thereof. The lower lugs are similarly attached to an insulating bar which has extensions thereon and which are mounted in guides formed on the frame and which guide the said bar for movement in a vertical direction. The heating element is alternately wound on the lugs of the upper and lower bars to form vertically extending reaches. At the lower portions of the end frame members are provided leaf springs which are insulated therefrom and which are anchored thereto and which extend across the toasting chamber and engage the lowermost bars of both of the heating units. These leaf springs are tensioned to urge the said bars downwardly. In this manner the reaches of the heating elements are tensioned and expansion due to heat of the heating elements is taken up by the said leaf springs.

The modification illustrated is similar in construction to the form described except that the lower support for the insulating lugs is made fixed and the upper support made movable. For moving the upper support a U-shaped operating member is employed having legs disposed at the ends of the heating units and connected to the upper support. The connecting bar of this operating member is disposed below the heating units and engaged by a leaf spring attached to a bar carried by the frame of the toaster.

In the construction of the heaters for electric toasters the usual procedure has been to employ sheets of mica on which the heating elements are wound. Such construction is expensive and causes appreciable loss of heat through the case of the toaster. The instant invention overcomes this difficulty by utilizing ceramic or other similar insulating lugs for supporting the heating element and in further using tensioning means for maintaining the reaches of the heating elements at all times taut.

For the purpose of illustrating the invention a frame of an electric toaster has been shown in the drawing which is indicated by the reference character A. This frame consists of end frame members 11 and 12 and an upper frame member 13 connected thereto. The lower portions of the end frame members are formed with flanges 14 which extend outwardly therefrom and which lie in a common plane. Connecting bars 15 are secured to these flanges by means of bolts 16. When the invention is used with a toaster having a base to which the frame may be attached the said bars may be omitted and the frame directly attached to the base of the toaster through the flanges 14. In such case, however, the bars may be retained if desired and particularly when the form of the invention shown in Figs. 4, 5 and 6 is employed.

In the particular frame shown provision is made for two heaters B and C. These heaters being identical in construction only the heater B and associated structure will be described in detail. The heater B provides heat for a toasting chamber 17 in which the bread to be toasted is placed. This toasting chamber is formed by means of two plates 19 and 20 which extend between the end frame members 11 and 12 and which are spaced from one another and which in conjunction with the said end frame members form the toasting chamber 17. On the ends of said plates are formed facing flanges 33. It will be noted that the said chamber as far as the plates 19 and 20 are concerned is open at the top and bottom. In the upper frame member 13 of the frame A is formed openings 21 one of which registers with the upper open end of the chamber 17 and which are surrounded by flanges 22. Similar openings are formed in the case of the toaster and through which openings the bread may be inserted into the toasting chamber through the upper open ends of the same. Suitable timing mechanism and supporting means for the bread may also be provided utilizing structure well known in the art which has not been disclosed in this application.

The plates 19 and 20 of the heater B are formed at their upper ends with ears 23 which extend through openings 24 in the upper frame member 13. These ears are bent over to hold the said plates in upright position, the said plates being free from the end frame members 11 and 12. This permits of the said plates expanding downwardly as the same become heated without causing warping of the plates.

The heating means for the heater B consists of two heating units 25 and 26 which are identical in construction. For this reason only the heating unit 25 will be described in detail. This heating unit comprises two bars 27 and 28 which are constructed of ceramic material and which form supports for the heating element. The bar 27 is arranged adjacent the plate 19 and at the upper end of the same and the bar 28 is arranged adjacent the plate 19 at the lower portion of the same. On the ends of the bars 27 and 28 are formed extensions 29 and 30 which project through slots 31 and 32 in the flanges 32, bent outwardly from the vertical edges of the plate 19. The said bars are formed with grooves 34 in the same which provide lugs 35 and 36 therebetween, the lugs 35 being formed on the bar 27 and the lugs 36 being formed on the bar 28. The heating element of the heating unit is indicated at 18 and consists of a length of resistance wire which is alternately wound about the lugs 35 and 36 as best shown in Fig. 3 to form vertically extending reaches 37. The ends of the heating element terminate at the ends of the lower bar 28 and are connected to terminals supported thereby as will be presently explained in detail.

The lower bar 28 of both the heating units 25 and 26 are supported by means of two transversely extending leaf springs 38. These leaf springs have attached to them at their centers by means of bolts 51 connectors 39 which extend through insulating bushings 40 mounted in the end frame members 11 and 12. The ends of the springs 38 are disposed beneath the bar 28 and are attached thereto by means of bolts 41. These springs are normally tensioned to urge the bars 28 downwardly so as to take up any slack in the reaches 37 of heating elements 18 occasioned by expansion of said reaches due to energization of the heating elements. The connectors 39 being secured to the springs 38 prevent the bars 28 from any appreciable lateral movement and due to the fact that the extensions 30 fit in the slots 32 of flanges 33 the plates 19 and 20 are also held from appreciable lateral movement at their lower ends. The slots 32 in the flanges 33 of plates 19 and 20, however, guide the extensions 30 for vertical movement and said plates can themselves move relative to the bar 28 thereby permitting of free expansion of either the plate or the reaches of the heating elements. The ends of the heating elements 18 are bolted on to the bolts 41 and thus form connectors for connecting the heating elements to the source of electrical power. The circuit for energizing the heaters is connected to these connectors externally of the frame A, the connectors 39 extending outwardly beyond the insulators 40 as shown in Figs. 1 and 3. It will be readily seen in the drawings that the heating elements 18 are spaced from the plates 19 and 20. These plates serve as reflectors and reflect the heat directed toward them by the heating elements back into the toasting chamber 17.

For holding the bread away from the heating elements, guard wires 42 are employed which have angular portions 43 and 44 at the upper and lower ends of the same. These portions extend through the plate 19. The portions 43 on the back of the plate 19 have hooks 45 which hook into eyes 46 struck out of the material of said plates. The lower angular portions 44 extend through the lower part of the plate 19 and prevent the hooks from becoming unhooked from the eyes. These portions are riveted over as indicated at 47 to securely hold the guard wires in place.

Due to the fact that the reaches 37 of the heating elements extend in a vertical direction the toasting chamber 17 would reach a higher temperature at the upper end as compared with the lower end. To compensate for this disadvantage a louver 49 is employed which is formed by striking the metal out of the plates 19 and 20 at their upper ends. These louvers provide air inlets 50 which allow the cool air from the exterior of the heater to enter the chambers 17 and mix with the heated air to moderate the temperature at the upper portion of the toaster.

The operation of the invention is as follows: Due to the fact that the reaches 37 of the heating elements 18 extend across the forward portion of the bars 27 and 28, the said reaches become spaced from the reflector 19. The said reaches are also disposed inwardly from the guard wires 42 so that the slice of bread when disposed between said guard wires is held in proper position with respect to the heating elements. As the toaster operates the length of the reaches 37 of the heating elements 18 increase and the springs 38 flex downwardly to hold the said reaches taut. Likewise, the plates 19 and 20 expand and the lower portions of the same move downwardly. Due to the said plates being held in position by the extensions 30 operating in grooves 32 the said plates travel downwardly in an unobstructed manner. The springs 38 being attached to the bars 28 and also being connected to the ends of the heating element serve a dual purpose, namely, in taking up the slack in the reaches of said heating element and in forming connectors for connecting the heating elements to the source of power.

The form of the invention illustrated in Figs. 4, 5 and 6 differs only from that shown in Figs. 1, 2 and 3 in that the upper bar of the heating units is made movable instead of the lower bar. Otherwise the remaining construction is the same and the description thereof will not be repeated. However, the same reference characters preceded by the numeral "1" will be used in Figs. 4, 5 and 6 to designate the corresponding parts.

In the modification illustrated a U-shaped operating member 158 is employed which consists of two vertical legs 159 and 160 and a horizontal connecting bar 161 therebetween. The legs 159 and 160 are disposed adjacent the flanges 133 formed on the plates 119 and 120. The bar 161 is disposed near the bottom of the toaster. In the upper ends of the legs 159 and 160 are formed openings 162 which snugly receive the extensions 129 formed on the bar 127. Slots 163 in the flanges 133 receive the said extensions and guide the bar 127 for vertical sliding movement. The extensions 130 on the bar 128 are snugly received in holes 164 in the flanges 133 and held from movement thereby. The legs 159 and 160 have slots 165 in the same and through which the extensions 130 pass. By means of this construction the operating member 158 is guided for vertical movement and upon upward movement moves the bar 127 upwardly to tension the reaches 137 of the heating elements 118.

Instead of using two frame bars 15, such as shown in Fig. 2, four such bars indicated at 115 are employed in the modification. These bars are disposed immediately below the bars 161 of the operating members 158 and are attached to the flanges 114 of the toaster frame by means of the bolts 116. Between the bars 115 and the bars 161 are disposed leaf springs 166 which are riveted to the bars 115 by means of rivets 167. These springs are arched and normally flexed so that the same urge the operating member 158 upwardly and correspondingly tension the reaches 137 of the heating elements 118.

The operation of the form of the invention shown in Figs. 4, 5 and 6 is the same as that previously described excepting that the upper bar 127 is moved upwardly to tension the reaches instead of the lower bar being moved downwardly.

The advantages of the invention are manifest. The device is extremely simple in construction and replaces the well-known sheets of mica formerly employed for supporting the heating elements. With the invention the slack occasioned in the heating elements upon energization is taken up so that the reaches of the heating elements remain properly spaced from the guard wires and reflector. In addition the louvers in the upper ends of the reflectors give uniform heating. Further buckling of the reflector is prevented thereby permitting the device to function in an extremely effective and advantageous manner.

Changes in the specific form of the invention, as herein described, may be made within the scope of what is claimed without departing from the spirit of the invention.

Having described the invention, what is claimed as new and desired to be protected by Letters Patent is:

1. In an electric heater, supporting means, a series of successively arranged insulating lugs disposed at one locality on said supporting means, a second series of successively arranged insulating lugs disposed at another locality on said supporting means and spaced from the first series of lugs, an elongated heating element wound alternately about the lugs of each series to form spaced reaches extending between each series of lugs, a bar to which one series of lugs is attached, guide means for engaging the ends of said bar to guide said bar for movement toward and from said other series of lugs and leaf springs engaging said bar at its ends and reacting against said supporting means for urging said carrier away from said other series of lugs and substantially in the direction of extent of said reaches.

2. In an electric heater a plate forming a support, a series of successively arranged insulating lugs disposed at one locality on said plate, a second series of successively arranged insulating lugs disposed at another locality on said plate and spaced from the first series of insulating lugs, an elongated heating element wound alternately about the lugs of each series to form spaced reaches extending between each series of lugs, a bar to which one series of lugs is attached, projections at the ends of said bar, flanges on said plate extending in the direction of extent of said reaches and disposed at right angles to the major portion of said plate, said flanges having grooves therein extending in the direction of extent of said reaches and in which said projections are received and resilient means for urging said bar for movement along said grooves and in a direction away from said other series of lugs to take up the slack in said reaches produced by the energization thereof.

3. In an electric heater, a frame having spaced end frame members and an upper frame member connected thereto, a plate forming a vertical support and extending between said end frame members and carried by said frame, a series of successively arranged insulating lugs disposed at one locality on said plate, a second series of successively arranged insulating lugs disposed at another locality on said plate and spaced from the first series of insulating lugs, an elongated heating element wound alternately about the lugs of each series to form spaced reaches extending between each series of lugs, a bar to which one series of lugs is attached, projections at the ends of said bar, said plate having grooves therein extending in the direction of extent of said reaches and in which said projections are received, insulators carried by said end frame members, springs reacting against said insulators and against said bar near its ends, said springs urging said bar for movement away from said other series of lugs and substantially in the direction of extent of said reaches, the ends of said heating elements being connected to said springs, and connectors attached to said springs.

4. In an electric heater, a frame having spaced end frame members and an upper frame member connected thereto, a plate forming a vertical support and extending between said end frame members and carried by said frame, a series of successively arranged insulating lugs disposed at one locality on said plate, a second series of successively arranged insulating lugs disposed at another locality on said plate and spaced from the first series of insulating lugs, an elongated heating element wound alternately about the lugs of each series to form spaced reaches extending between each series of lugs, a bar to which one series of lugs is attached, projections at the ends of said bar, said plate having grooves therein extending in the direction of extent of said reaches and in which said projections are received, spring anchors secured to said end frame members and disposed laterally from said plate and leaf springs reacting against said spring anchors and said bar for urging said bar for movement substantially in the direction of extent of said reaches and away from said other series of lugs.

5. In an electric heater, a frame having spaced end frame members and an upper frame member connected thereto, a plate forming a vertical support and extending between said end frame members, said plate being attached to said upper frame member and being free from said end frame members, a series of successively arranged insulating lugs disposed at the upper end of said plate, a second series of successively arranged insulating lugs disposed at the lower end of said plate, an elongated heating element wound alternately about the lugs of each series to form spaced reaches extending between each series of lugs, a bar to which the lower series of lugs is attached, guide means on said plate for guiding said bar for vertical movement, said guide means restraining movement of said bar relative to said plate in a direction transverse of said plate, a leaf spring carried by each of said end frame members and extending transversely of said plate, said leaf spring being attached to said bar, said leaf springs restraining movement of said bar and the lower end of said plate in a lateral direction leaving said plate free to expand downwardly and said bar to move downwardly and substantially in the direction of extent of said reaches to take up the slack produced in the reaches of said heating element by the energization thereof.

6. In an electric heater, a frame having spaced end frame members and an upper frame member connected thereto, two spaced vertical plates disposed between said end frame members and forming therewith a bread oven, attaching means for securing said plates to said frame, a series of successively arranged insulating lugs disposed at the upper ends of each of said plates and within said bread oven, a series of successively arranged insulating lugs disposed at the lower end of each of said plates and within said bread oven, an elongated heating element adjacent each plate and wound alternately about the lower and upper lugs adjacent said plates to form two heaters each having spaced reaches extending between the upper and lower lugs, a first bar to which the lower series of lugs adjacent one plate is attached, a second bar to which the lower series of lugs adjacent the other plate is attached, said bars being spaced from one another laterally, leaf springs extending between said bars and reacting against the same, spring anchors for said springs engaging said springs near their centers and mounted on said end frame members, said springs urging said bars downwardly and substantially in the direction of extent of said reaches to take up the slack in the reaches of both of said heaters produced upon energization thereof.

7. In an electric heater, vertically extending supporting means, a series of successively arranged insulating lugs disposed at the lower portion of said supporting means, a second series of successively arranged insulating lugs disposed at the upper portion of said supporting means and spaced from the first series of lugs, an elongated heating element wound alternately about the lugs of each series to form spaced reaches extending between each series of lugs, a carrier to which the upper series of lugs is attached, guide means for guiding said carrier for movement toward and from said other series of lugs, a U-shaped operating member having legs connected at their free ends to said carrier and having a connecting bar disposed beneath said lower lugs and resilient means acting on said connecting bar to urge said operating member upwardly to move the carrier upwardly and tension the reaches of said heating element.

8. In an electric heater, supporting means, a series of successively arranged insulating lugs disposed at one locality of said supporting means, a second series of successively arranged insulating lugs disposed at another locality on said supporting means and spaced from the first series of lugs, an elongated heating element wound alternately about the lugs of each series to form spaced reaches extending between each series of lugs, a bar to which one series of lugs is attached, guide means for engaging the ends of said bar to guide said bar for movement toward and from said other series of lugs, resilient conductors attached to said supporting means and insulated therefrom, and means for connecting said conductors to said bar at its ends and to the ends of said heating element, said conductors urging said bar substantially in the direction of extent of said reaches and in a direction away from the other series of lugs.

References Cited in the file of this patent

UNITED STATES PATENTS

| Number | Name | Date |
|---|---|---|
| 494,291 | Dewey | Mar. 28, 1893 |
| 533,795 | Edwards | Feb. 5, 1895 |
| 598,640 | McElroy | Feb. 8, 1898 |
| 1,065,015 | Youmans | June 17, 1913 |
| 1,102,393 | Denhard | July 7, 1914 |
| 1,480,084 | Lamb | Jan. 8, 1924 |
| 1,533,241 | Forshee | Apr. 14, 1925 |
| 1,645,327 | Hirshfeld et al. | Oct. 11, 1927 |
| 1,662,652 | Zimmer | Mar. 13, 1928 |
| 1,884,825 | Pavelka | Oct. 25, 1932 |
| 2,151,401 | Belcher | Mar. 21, 1939 |
| 2,462,607 | Browne | Feb. 22, 1949 |
| 2,548,511 | Anderson | Apr. 10, 1951 |

OTHER REFERENCES

Sunbeam News, vol. 6, No. 3 (received in U. S. Pat. Off. January 7, 1950). (Copy in Div. 58.)